(12) United States Patent
Alsahnawi et al.

(10) Patent No.: US 12,455,962 B2
(45) Date of Patent: Oct. 28, 2025

(54) SYSTEMS AND METHODS FOR PREVENTING COMMUNICATIONS WITH MALICIOUS CRYPTOGRAPHY-BASED STORAGE APPLICATION ADDRESSES USING CONSENSUS

(71) Applicant: Capital One Services, LLC, McLean, VA (US)

(72) Inventors: Hazar Alsahnawi, McLean, VA (US); Austin Erickson, Herndon, VA (US); Shannon Yogerst, New York, NY (US); Dan Lin, Arlington, VA (US); John E. Jones, IV, Alexandria, VA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 318 days.

(21) Appl. No.: 18/176,409

(22) Filed: Feb. 28, 2023

(65) Prior Publication Data
US 2024/0289444 A1 Aug. 29, 2024

(51) Int. Cl.
G06F 21/55 (2013.01)
G06F 21/12 (2013.01)
G06F 21/60 (2013.01)

(52) U.S. Cl.
CPC .......... *G06F 21/554* (2013.01); *G06F 21/121* (2013.01); *G06F 21/552* (2013.01); *G06F 21/602* (2013.01)

(58) Field of Classification Search
CPC .... G06F 21/121; G06F 21/552; G06F 21/554; G06F 21/566; G06F 21/602; H04L 63/14; H04L 63/1416; H04L 63/1441
See application file for complete search history.

(56) References Cited

U.S. PATENT DOCUMENTS

| | | | |
|---|---|---|---|
| 11,777,975 B1 * | 10/2023 | Jurkevicius | H04L 67/104 726/22 |
| 12,137,119 B2 * | 11/2024 | Kallos | H04L 63/1483 |
| 2018/0025166 A1 * | 1/2018 | Daniel | G06F 9/5011 713/189 |
| 2018/0101560 A1 * | 4/2018 | Christidis | H04L 9/3236 |
| 2019/0253239 A1 * | 8/2019 | Shao | H04L 9/0637 |
| 2019/0363938 A1 * | 11/2019 | Liebinger Portela | H04L 9/3236 |
| 2019/0372834 A1 * | 12/2019 | Patil | H04W 8/04 |
| 2019/0384748 A1 * | 12/2019 | Roennow | G06F 16/1837 |
| 2021/0266337 A1 * | 8/2021 | Li | H04L 63/1408 |
| 2021/0312472 A1 * | 10/2021 | Baskaran | G06F 11/3616 |
| 2021/0314179 A1 * | 10/2021 | Liao | H04L 9/3297 |
| 2022/0366088 A1 * | 11/2022 | Grover | G06F 21/64 |
| 2023/0050048 A1 * | 2/2023 | Chauhan | G06Q 30/0609 |

(Continued)

*Primary Examiner* — Eric W Shepperd
(74) *Attorney, Agent, or Firm* — Foley & Lardner LLP

(57) ABSTRACT

Systems and methods for preventing blockchain functions associated with malicious entities are disclosed herein. A first blockchain status update may be received from a first authorizing entity. A first counter and a first plurality of authorizing entities can be determined. The first counter and the first plurality of authorizing entities can be updated. The first counter can be compared to a consensus threshold. A first instruction to block requests for communications to the first entity address can be generated. A confirmation of the first instruction can be generated for display.

18 Claims, 5 Drawing Sheets

(56) References Cited

U.S. PATENT DOCUMENTS

| | | | |
|---|---|---|---|
| 2023/0139892 A1* | 5/2023 | Chung | H04L 67/10 709/226 |
| 2023/0298007 A1* | 9/2023 | Gupta | G06Q 20/3674 705/67 |
| 2023/0300147 A1* | 9/2023 | Zhu | H04L 63/14 726/23 |
| 2024/0235861 A1* | 7/2024 | Lavid Ben Lolo | H04L 9/50 |
| 2024/0303663 A1* | 9/2024 | Cheng | G06Q 20/4016 |

* cited by examiner

100

| Flagged Entity Address | Counter | Authorizing Entities |
|---|---|---|
| 0x23Dc750bb2B52514F1f2300F0fd51F119272D698 | 3 | User 2 |
|  |  | User 3 |
|  |  | User 5 |
| 0x720704ABBe52224c78Ad54a3E304256B82Eff9Fe | 5 | User 1 |
|  |  | User 2 |
|  |  | User 3 |
|  |  | User 4 |
|  |  | User 7 |

FIG. 1A

SYSTEMS AND METHODS FOR PREVENTING COMMUNICATIONS WITH MALICIOUS CRYPTOGRAPHY-BASED STORAGE APPLICATION ADDRESSES USING CONSENSUS

BACKGROUND

In recent years, the use of blockchain technology for various applications, including, but not limited to, smart contracts, non-fungible tokens, cryptocurrency, smart finance, blockchain-based data storage, etc. (referred to collectively herein as blockchain applications) has exponentially increased. Each of these applications benefits from blockchain technology that allows for the recording of information that is difficult or impossible to change (either in an authorized or unauthorized manner). For example, a blockchain is essentially a digital ledger of transactions that is duplicated and distributed across the entire network of computer systems on the blockchain. That is, the digital ledger of a blockchain is a decentralized source of information that does not require a central authority to monitor transactions, maintain records, and/or enforce rules. Instead, technology underlying the blockchain network, namely cryptography techniques (e.g., secret-key, public-key, and/or hash functions), consensus mechanisms (e.g., Proof of Work ("POW"), Proof of Stake ("POS"), Delegated Proof of Stake ("dPOS"), Practical Byzantine Fault Tolerance ("pBFT"), Proof of Elapsed Time Broadly ("PoET"), etc.), and computer networks (e.g., peer-to-peer ("P2P"), the Internet, etc.) combine to provide a decentralized environment that enables the technical benefits of blockchain technology.

However, despite these benefits and despite the wide-ranging number of potential applications, practical implementations of blockchain technology have been hindered by several technical problems. First, blockchain technology often relies on large amounts of energy and dedicated resources to ensure that consensus mechanisms (e.g., POW) run. Second, despite the mainstream popularity of blockchain technology, practical implementations of blockchain technology require specialized knowledge to design, program, and integrate blockchain technology-based solutions, which limits the amount of people and resources available to create these practical implementations. Third, blockchain technology, despite its decentralized nature, faces scalability issues and/or low transaction speeds when attempting to accommodate a large number of users at a given time. Finally, depending on the application and the intent of the users, the key benefits of blockchain technology such as a public ledger, use of digital wallets, and immutable transactions, may be seen negatively by users that wish to maintain privacy of transactions, wish to know the true identities of users involved in transactions, and wish to reverse unauthorized transactions, respectively. These technical problems present an inherent problem with attempting to use a blockchain technology-based solution in preventing the execution of blockchain functions directed to malicious controllers of cryptography-based storage application addresses.

SUMMARY

Methods and systems are described herein for novel uses and/or improvements to blockchain technology. As one example, methods and systems are described herein for monitoring blockchain communications for reference to malicious entity addresses. For example, the system may block blockchain functions based on whether a threshold number of authorizing entities has flagged the same malicious entity address through a self-executing program.

Existing systems may lack ways to determine whether a given target address (e.g., a cryptography-based storage application) may be malicious. For example, a user initiating a communication with a given address, such as sending a secure message, may not possess information about whether the address has a history of malicious behavior, such as phishing. The user may only possess limited metadata information regarding the target address, and may have to manually search for previous transactions associated with the target address with considerable effort. Additionally, conventional systems lack a way to store any of these malicious addresses in a manner that can be shared with other secure entities. Thus, when a system detects an address may be involved with misuse or other pernicious behavior, there may be no way to store and share this information to block further malicious communications to this address by other users, thereby hampering efforts to reduce this behavior system-wide.

Blockchain technology may enable evaluation and documentation of malicious individuals. However, adapting blockchain technology for this practical benefit faces several technical challenges. For example, while sharing addresses associated with malicious behavior publicly may be possible through the blockchain, it is difficult to determine who may be trustworthy enough to share such information. For example, bad actors may flood the blockchain with false reports of malicious behavior in order to mislead or overload the reporting system. Additionally, users may not have the time or processing power prior to executing a blockchain function to search through the blockchain for all reported malicious actors, even if such actors are reported publicly on a blockchain. As blockchain records may be permanent, any additions to the list may not be able to be purged, such as if a malicious actor reforms behavior or has been added in error.

To overcome these technical deficiencies in adapting existing blockchain technology for this practical benefit, methods and systems disclosed herein may determine whether a new malicious entity has been detected and submit the corresponding malicious entity address to a smart contract on a permissioned blockchain. The malicious entity may be added to a database only if a threshold number of other authorizing entities have added the same entity. For example, the system may receive multiple reports of malicious behavior by a particular cryptography-based storage application address. In response, the system may submit these reports to a permissioned blockchain node with access to a smart contract. The permissioned blockchain may be configured only to enable authorized entities to read, add, and/or remove malicious entities from a database attached to the smart contract, in order to exclude unauthorized users to report such entities. Additionally, a given malicious entity may only be added to the smart contract if a number of authorized entities above a threshold value have also reported the same malicious entity to the smart contract, thereby preventing "spamming" (e.g., flooding the database with unproven malicious entities) by any single authorized entity or a subset of such entities. By solving this technical problem, the system may provide the practical benefit of providing a consensus-based method for tracking malicious entities transparently, and across multiple authorizing institutions, in a way that mitigates fraud or misuse of blockchain communications in the case that multiple authorizing entities have detected a fraudulent or malicious actor.

In some aspects, the system may receive a first blockchain status update from a first authorizing entity, wherein the first blockchain status update indicates a first entity address corresponding to a first flagged entity. The system may determine, using a first self-executing program at a blockchain node, a first counter corresponding to the first entity address and a first plurality of authorizing entities that have submitted at least one blockchain status update corresponding to the first entity address. The system may update the first counter and the first plurality of authorizing entities. The system may compare the first counter to a consensus threshold, wherein the consensus threshold indicates a number of authorizing entities for which consensus for the first flagged entity is determined. Based on comparing the first counter to the consensus threshold, the system may generate a first instruction to block requests for communications to the first entity address. The system may generate for display, on a user interface, a confirmation of the first instruction.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1A shows an illustrative diagram for a database that includes counters to track consensus corresponding to malicious entity addresses submitted by authorizing entities, in accordance with one or more embodiments.

DETAILED DESCRIPTION OF THE DRAWINGS

Figure 1B:
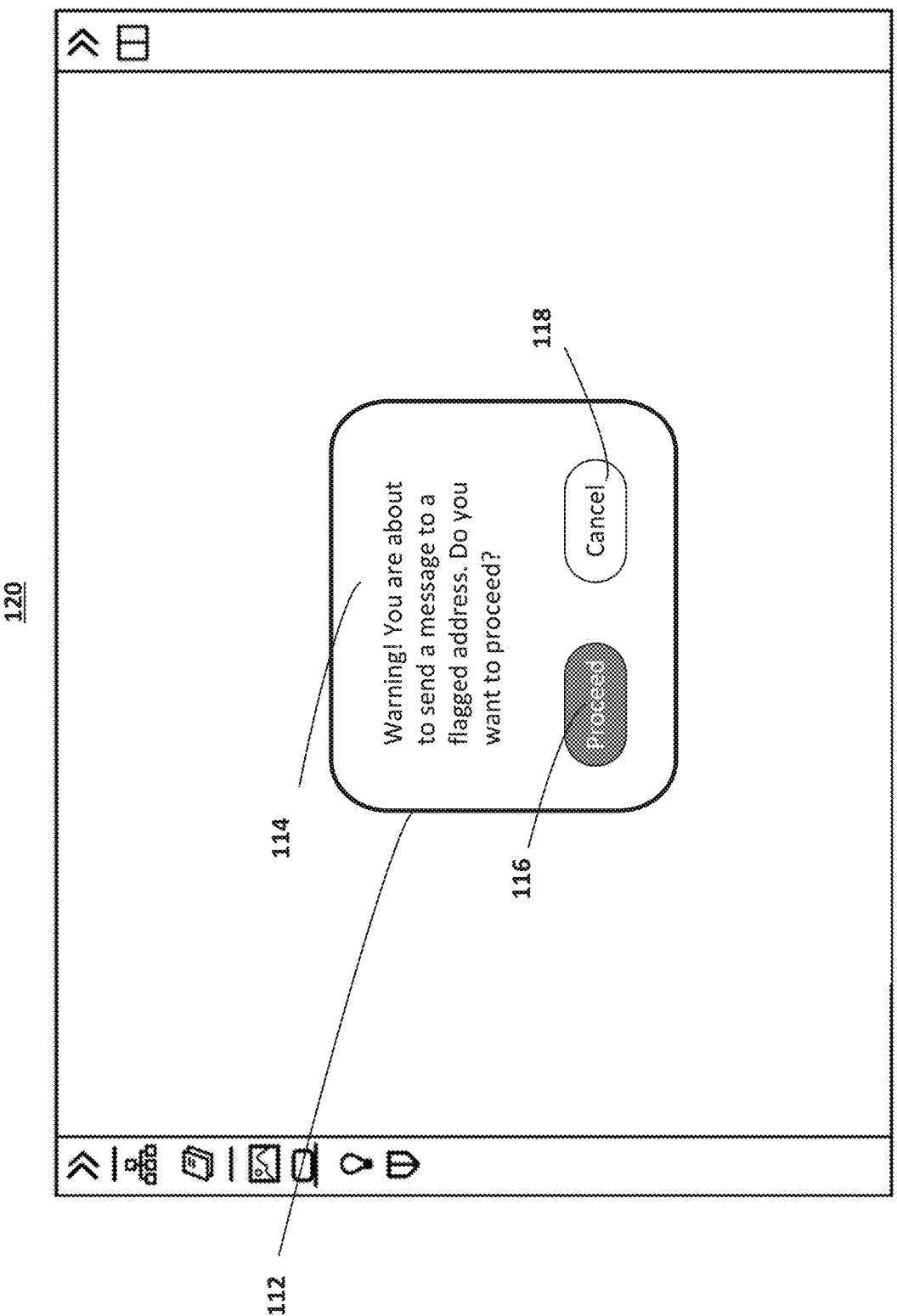
FIG. 1B shows an illustrative diagram of a user interface for notifying users of a detection of a flagged entity address, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows an illustrative diagram for database 100, which includes counters to track consensus corresponding to malicious entity addresses submitted by authorizing entities, in accordance with one or more embodiments. For example, database 100 includes a listing of flagged entity addresses (e.g., flagged entity addresses 108 and 110), as shown in column 102, as well as a counter of authorizing entities who have flagged the given entity address, as shown in column 104. In some embodiments, database 100 includes a list of identifiers of authorizing entities that flagged or submitted a report related to a flagged entity address, as shown in column 106. For example, authorizing entities, such as users listed in column 106, may submit blockchain status updates to a self-executing program, where the blockchain status updates may indicate that an entity address has been associated with malicious or suspicious behavior and that, therefore, the address should be flagged. By maintaining a register of such reports, as summarized by database 100, the system enables tracking of which addresses may have been flagged, as well as by whom. In some embodiments, the system may determine to block requests for communications that are associated with such flagged addresses. The system may only block such requests if a threshold has been reached for the number of authorizing entities that have flagged the given flagged address. By doing so, the system ensures that addresses may not be added to the database capriciously or otherwise unfairly. Thus, the system leverages a consensus system by authorizing entities in order to track malicious addresses and make decisions accordingly.

The system may be used to execute blockchain functions, such as communications through the blockchain. In disclosed embodiments, a communication may include any digital message, data, information, or resources transmitted between users or devices. For example, communications may include a transmission of encrypted data, messages (such as those including digital signatures), and/or transmission of control of cryptographic resources, such as non-fungible tokens and/or cryptocurrency. In disclosed embodiments, encrypted data may include information, numerical data, or textual data that has been encrypted with an encryption algorithm. For example, encrypted data may be encrypted using symmetric-key encryption algorithms, such as stream ciphers, substitution ciphers or block ciphers. Symmetric-key encryption may ensure that shared secrets may be disseminated and read only by those with designated access (e.g., those with whom a secret key has been shared). For example, encryption may satisfy the Advanced Encryption Standard (AES). Encrypted communications may utilize asymmetric key (or public key) encryption algorithms, such as elliptic curve cryptography (e.g., Elliptic Curve Digital Signature Algorithm (ECDSA) or Elliptic Curve Diffie-Hellman) or the Rivest-Shamir-Adleman (RSA) cryptosystem. By utilizing an asymmetric key, a user may ensure that only intended recipients may read a message. For example, a user may encrypt a message using the intended recipient's private key, thereby generating a ciphertext. The intendent recipient may decrypt the message using their own private key, connected to the associated public key using a cryptographic function. Thus, the system enables requests for communications to be received by the system, enabling digitally-secured communications between users.

The system may be used to send or receive digital communications with associated digital signatures. In disclosed embodiments, digital signatures may include mathematical schemes for verifying the authenticity of digital messages, documents, or other data/information. Digital signatures may provide indications that a message was created by a known sender (e.g., authentic) and unaltered in transit (e.g., integrity). Digital signatures may utilize asymmetric cryptography. For example, a first user may append a signature encrypted based on the first user's private key and based on a message (e.g., an encrypted hash of the message), and send these to a second user. The second user may utilize the first user's public key in order to verify the authenticity of the message, and may computer a hash of the message to ensure that it has not been altered following sending. By receiving and handling digital signatures, the system may enable digitally-secured transmissions between users. In some embodiments, the system may execute additional verification steps for verifying the intended recipient, for example, through checking database 100 for whether the intended recipient's address has been flagged by authorizing entities. Thus, the system improves evaluation of given digitally-secured transactions, such as those generated using digital signatures.

The system may be used to send, receive, or handle cryptographic resources. In disclosed embodiments, a cryptographic resource may include any asset, feature or element that may be a transferrable digital representation. In some embodiments, cryptographic resources may be designed in a way that prohibits their copying or duplication, and may include cryptocurrency reserves, such as bitcoin or ether. For example, an indication of a value of cryptographic resources, such as cryptocurrency reserves to be sent or received, may include a value of bitcoin or ether for which control will be transferred to another user. In disclosed embodiments, the indication of cryptographic resources may be compared to a threshold value before a decision regarding the risk of an intended communication is made. The system can determine to block communications with flagged entities if the indication is higher than the threshold value. Additionally or alternatively, the system may only check for whether an intended recipient's address has been flagged for indications of cryptographic resources that are above the threshold value, in order to make processing of requests for communications more efficient.

In some embodiments, cryptographic assets may comprise non-fungible tokens, or security tokens, such as a token that represents a car's vehicle identification number. As cryptographic resources may be digitally protected and sensitive, a sender of such resources may benefit from verification of the intended recipient. For example, as standard blockchain communications are not reversible, a sender of cryptographic resources through a blockchain may benefit from verifying that a recipient of such resources is not malicious or does not possess a history of suspicious behavior. By tracking addresses that may be malicious, the system may improve user confidence in blockchain communications by flagging intended recipients of requested communications that have problematic reputations prior to executing the communications.

Cryptographic resources and/or messages may be sent using cryptography-based storage applications. In disclosed embodiments, a cryptography-based storage application may include any type of application, software or program that enables storage of cryptographic resources. In some embodiments, a cryptography-based storage application may include a cryptowallet, for example, which may comprise cryptocurrencies, security tokens and/or non-fungible tokens. In some embodiments, cryptography-based storage applications may have an address associated with them, known as a cryptography-based storage application address, which may comprise an alphanumeric or hexadecimal string, for example, that is allocated on a blockchain network. In some embodiments, the cryptography-based storage application address may correspond to the cryptography-based storage application's public key. In some embodiments, the cryptography-based storage application may comprise or be associated with a private key. In some embodiments, the cryptography-based storage application may be accessible via a blockchain network. By utilizing cryptography-based storage applications and their related security features, cryptographic resources may not only be stored securely, but they may also be transferred securely using, in some embodiments, asymmetric encryption, such as an elliptic curve digital signatures encryption algorithm. As cryptography-based storage applications may comprise addresses, and may be associated with an owner or another entity, the system may utilize cryptography-based storage applications in order to identify the history of blockchain operations corresponding to a given owner or entity. For example, the system may leverage a communication history on the blockchain associated with a given cryptography-based storage application to evaluate such an owner, such as whether the corresponding owner is associated with suspicious or fraudulent activity. In response, the system may receive reports of malicious behavior and record the address corresponding to the associated cryptography-based storage application.

The system may determine whether an entity has been flagged. In disclosed embodiments, a flagged entity may include an entity, organization, individual or user that has been found to be associated with malicious, suspicious, abnormal, or otherwise undesirable behavior, actions, or intentions. For example, a flagged entity may include an owner of a cryptography-based storage application whose address has been associated with fraudulent blockchain functions, such as phishing scams. A flagged entity can include users known to have perpetrated criminal activity or fraud, for example, or may be particular cryptography-based storage application addresses associated with such users. In some embodiments, a flagged entity may be flagged by any user. Additionally or alternatively, only certain users or entities may be authorized to flag such entities.

The system may detect malicious behavior associated with a flagged entity or an address. In disclosed embodiments, malicious behavior may include any behavior against moral, legal, or allowed standards, such as actions or behavior carried out with the intention of unfairly benefiting from or harming others. For example, malicious activities may include cyber-attacks or malware, such as actions intended to steal data, information, or items of value from one or more users. In non-limiting cases, a malicious behavior may be characterized by hacking or fraud, such as phishing scams. For example, an entity associated with a cryptography-based storage application that regularly claims to provide products to users in a fraudulent manner may characterize malicious behavior, such as by not providing the intended product, or by stealing data or funds being used to purchase the product. By enabling authorized users to flag entities that may be associated with malicious behavior, the system enables the system to prevent further communications, transactions, or interactions through the blockchain with such entities, thereby improving the security and mitigating the risk associated with such blockchain communications.

FIG. 1B shows an illustrative diagram of user interface 120 for notifying users of a detection of a flagged entity address, in accordance with one or more embodiments. For example, the system may generate dialog box 112 for display on user interface 120, where dialog box 112 may include a warning message, such as message 114. In some embodiments, message 114 may indicate that a request for a communication submitted by a user involves a flagged address, and may enable the user to select whether to proceed with the communication based on this information. For example, the user may submit input to the system through button 116 in order to proceed with the communication, or button 118 in order to cancel the communication. In a non-limiting example, message 114 may indicate that the request for the communication is blocked, such as due to the address being associated with a flagged entity. By relaying such information to users who are requesting transmission of blockchain communications, the system provides security and transparency regarding risky blockchain functions, thereby enabling users to prevent or mitigate suspicious or fraudulent transactions. As standard blockchain functions are non-reversible, such preventative measures assist in reducing the frequency of criminal or fraudulent behavior associated with blockchain communications and, as such, may prevent unintended loss of cryptographic resources, privacy, or breaches of security.

The system may receive, generate, or handle blockchain status updates. In disclosed embodiments, a blockchain status update may include a message, notification, or dataset indicating information related to the blockchain. For example, in a non-limiting case, blockchain status updates may be characterized by an identifier of an entity address that corresponds to a flagged entity, such as an entity flagged due to malicious behavior detected from the address. In some embodiments, the blockchain status update may be received from an authorizing entity, in order to ensure that blockchain status updates are not frivolously generated or transmitted. By enabling the generation, transmission and/or receipt of blockchain status updates, the system may track malicious entities or problematic blockchain addresses and ensure that any communications to such addresses are evaluated and subsequently blocked or handled to mitigate the risk of security breaches.

The system may interface with one or more self-executing programs. In disclosed embodiments, a self-executing program can include any computer code, program or process that may run in response to satisfied conditions, without necessary input from a particular user or entity. For example, self-executing programs may comprise a smart contract, or any self-executing contract, written into code. The self-executing program may exist across a distributed, decentralized blockchain network. Smart contracts permit transactions and agreements to occur without the need for a central authority, legal system, or external enforcement mechanism. Thus, in the absence of centralized structures for handling cryptographic resources, as is currently the case, smart contracts and self-executing programs provide effective ways to handle communication requests as they occur. For example, self-executing programs may handle reports of malicious actors or other malicious behavior associated with particular blockchain addresses. In a non-limiting case, in response to receiving the flagged blockchain address, the self-executing program may record a count of how many other entities may have reported the address. Based on the count, the self-executing program may, in some embodiments, determine to allow or block any requests for communications directed toward the flagged blockchain address. Thus, the self-executing program may enable evaluation of the trustworthiness or reputation of blockchain addresses and/or their controllers. By relying on self-executing code to monitor requests for communications for flagged entities automatically and without intervention, the system may incorporate such safeguards and conditions in order to maintain the integrity of such communications, by reducing the likelihood of communications to problematic entities.

The system may receive blockchain status updates, for example, from authorizing entities. In disclosed embodiments, an authorizing entity may include any entity with the role of authorizing communications, functions, or other actions, such as those on the blockchain. For example, authorizing entities may include institutions, organizations or companies who manage flow of communications, data, and/or resources (e.g., cryptographic resources) between entities. In a non-limiting case, authorizing entities may include users involved in monitoring communication requests on the blockchain for fraud or security issues and, therefore, may evaluate addresses based on an evaluation of whether associated behavior is suspicious. For example, in some embodiments, only authorizing entities may have access to a self-executing program that manages such flagged entities. In another non-limiting example, authorizing entities may be the only entities with access to the blockchain associated with the self-executing program. By allowing only authorizing entities to submit blockchain status updates for flagged entities (e.g., malicious actors), the system ensures that malicious actors themselves cannot mislead, flag, or frivolously submit requests to flag entities unfairly or in a misleading manner.

Blockchain status updates can include entity addresses. In disclosed embodiments, an entity address can include any address, such as a blockchain address, associated with an entity. For example, an entity address may include an identifier of a location, such as a storage location, a node location, or a server location, corresponding to the entity. In some embodiments, an entity address may correspond to a hashed public key associated with a cryptography-based storage application (e.g., a cryptowallet). An entity address can be an alphanumeric string of characters; in some embodiments, the entity address may be a blockchain address of 26-35 characters in length. For example, an entity address may be a hexadecimal number. As entity addresses may be the principal means for defining blockchain communication endpoints (such as a location for the origin or intended recipient of a cryptographic communication), determining an entity address may enable the system to track communications between users and thereby determine whether a user intends to send a communication to a malicious entity by detecting the address corresponding to the entity.

The system may use a counter, for example, to keep track of flagged entities. In disclosed embodiments, a counter may include one or more values or data that indicate a number of authorizing entities that have submitted at least one blockchain status update corresponding to a given entity address. For example, a counter may include the number of blockchain status updates submitted against a given entity address (e.g., due to the entity address being flagged for malicious behavior). By counting the number of reports or flags relating to a given entity address, the system may keep track of how prolific a given malicious entity may be, and make decisions blocking the entity based on this information. By making authorization decisions based on the number of authorizing entities flagging a given address, the system prevents single actors from unilaterally causing authorization decisions by, for example, reporting entity addresses of enemies or competitors. For example, in disclosed embodiments, the system may check for a consensus threshold to be reached by a given counter corresponding to an entity address, before further authorization decisions are made.

The consensus threshold may be a number of authorizing entities that must have agreed to the untrustworthiness or maliciousness of a given flagged entity before such communication requests are blocked, for example. In some embodiments, the system may determine a percentage of the authorizing entities that have flagged a given user based on the counter, and compare this percentage with the consensus threshold (e.g., where the consensus threshold is represented as a threshold percentage). Thus, the system may ensure that a sufficient number of authorizing entities have submitted a request to reach consensus and, thus, prevent unfair or frivolous flagging of entities.

The system may issue instructions to users, the blockchain, or the self-executing program. In disclosed embodiments, instructions may include explicit or implicit requests, such as relating to allowing or blocking blockchain transactions. For example, the system may generate instructions to block requests for communications to an entity address if it is determined that the entity address corresponds to a flagged entity that has satisfied consensus criteria. In some embodiments, this instruction may comprise a blockchain communication with an empty or zero blockchain address or with a trivial message, thereby generating an invalid blockchain communication. In some embodiments, the system may generate an instruction to unblock blockchain communications to a given flagged entity. The instruction may comprise a valid blockchain communication, for example, with a valid target address, such that the blockchain communication is executed by the blockchain node. In some embodiments, the system may issue a confirmation of one of these instructions for display on a user interface. For example, the confirmation of the instructions could include message 114 in dialog box 112, as shown in FIG. 1B. The system may enable user input, such as through buttons 116 and 118, before transmitting the instructions to the blockchain node, for example. By generating instructions to block or unblock communications, based on whether a given communication is associated with a flagged blockchain address, the system may prevent unsecure or risky communications from being executed. Thus, the system serves to protect users from unintended or criminal loss of data, privacy or cryptographic resources.

The system may determine timestamps associated with blockchain status updates. In disclosed embodiments, a timestamp may include a date, time, and/or other temporal marker. For example, a timestamp may include a date and time for a blockchain status update submitted by an authorizing entity. The system may determine a timestamp using a system clock setting. In disclosed embodiments, a system clock setting may include a time setting that is standardized across a computer network, blockchain network, or other system. For example, a system clock setting may be determined by an atomic clock run by the National Institute of Standards and Technologies. By utilizing a system clock setting rather than, for example, a local time setting, the system may ensure that any generated timestamps are consistent across the system, regardless of the device on which the timestamp was generated. By including a timestamp, the system may track when such requests are received. For example, the system may receive two blockchain status updates directed toward the same entity address and, thus, have the effect of flagging two entities. By recording timestamps related to both blockchain status updates, the system may determine, for example, an update frequency for the first entity address. The update frequency can include a quantitative measure of how often a blockchain status update is directed toward the first entity address. In some embodiments, the update frequency may be calculated from more than two blockchain status updates (e.g., measured as an average frequency over multiple such updates). Thus, the update frequency, based on the associated timestamps, may provide information regarding whether the entity address is regularly flagged and, therefore, provide contextual information regarding whether the entity address is prolific or otherwise significant at a given point of time. Based on the update frequency, the system may determine whether or not to block communications to the entity address. By doing so, the system may ensure that emergent malicious entities are handled quickly, as and when they are detected and reported.

In some embodiments, a timestamp may be used to determine whether to remove (e.g., purge) an address from being counted or flagged as a malicious entity. For example, in some embodiments, the system may determine a timestamp for when the first instruction to block the communications was issued, and may measure a second timestamp at another time. The system can determine whether a long time has passed since communications to the entity have been blocked (e.g., a time greater than an "entity purging time threshold"). In these circumstances, the system may determine to unblock such requests if, for example, no further blockchain status updates have been received. The system may determine an entity purging time threshold. In disclosed embodiments, an entity purging time threshold may be an indication of an amount of time elapsed before which an address may be purged, deleted, or unflagged from being associated with malicious behavior. For example, an entity purging time threshold may specify that an address that has not been flagged through a blockchain status update for suspicious behavior in five years may be removed from the self-executing program. By doing so, the system may ensure that any addresses that have not been flagged in a sufficient amount of time (e.g., have reformed their malicious behavior, or have been controlled by a different entity) may not be subject to communication blocks in the future, thereby ensuring that the system may not block addresses that are no longer evidenced to be malicious.

The system may purge an entity address based on a request to do so (e.g., an entity purge request). In disclosed embodiments, an entity purge request may include a request to disassociate a given entity address with malicious behavior. For example, an authorizing entity may submit an entity purge request to purge a flagged entity from being flagged if, for example, the entity was flagged in error, or if the entity has reformed its behavior so as not to be problematic. For example, in response to the request, the system may determine to unblock communications directed towards the given flagged entity. By doing so, the system allows authorizing entities enhanced control over addresses flagged as malicious and enables flexibility in communication authorization decisions.

The system, or a self-executing program, may store information in a database associated with an off-chain database address. In disclosed embodiments, an off-chain database address may be an address to a database that does not reside within a blockchain (e.g., a blockchain node). For example, an off-chain database may include any data (e.g., counters, lists of authorizing entities and/or lists of entity addresses) that is stored or implemented outside of any blockchain system. For example, an off-chain database may include any cloud storage. For example, an off-chain database may include a collection of data stored on a distributed cloud system, Amazon Web Services, or Google Drive. By storing data off the blockchain, any information may be modified, removed, or added, without a log of such actions being visible to users of the blockchain. Thus, such malicious actor addresses may be stored confidentially to prevent the uncontrolled dissemination of these addresses beyond the stakeholders.

The system may only allow authorizing entities to submit blockchain status updates and/or access the self-executing program by utilizing authorizing entity credentials to verify such users. In disclosed embodiments, authorizing entity credentials may include any method of verification of users, entities, or devices. For example, authorizing entity credentials may include an authentication token, a piece of identification, or the like. In disclosed embodiments, an authentication token may include any electronic (e.g., digital, software or hardware) key that enables authentication of a user. An authentication token may include digital tokens, such as usernames, passwords, or digital certificates. In some embodiments, an authentication token may include hardware tokens, such as devices that may validate whether a user possesses the device upon connection to a user terminal. In some embodiments, an authentication token may include software, such as two-factor authentication applications, or software key generators. The system may utilize these authorizing entity credentials to validate that a user submitting a blockchain status update is indeed allowed to submit such requests. By doing so, the system may ensure that only trusted entities may manage the system, report problematic addresses, and access information regarding malicious actors. Thus, the system may ensure that unverified actors may not sabotage, disrupt or interfere with the blockchain communication authentication system.

The system can detect abnormalities in the request for communication. In disclosed embodiments, an abnormality may include any behavior that is unexpected, suspicious, or malicious in nature. In some embodiments, a detection of an abnormality may include detection of a large number of communications within a short period of time received at the account, potentially indicating a hacking or phishing attack. For example, the system may determine an abnormally high value or indication of cryptographic resources (e.g., cryptocurrency) requested to be transferred within the communication request. For example, in response to these abnormality detections, the system may generate abnormality detection messages that may be submitted to a plurality of authorizing entities. The abnormality detection messages may include details about the abnormality. Additionally, in some embodiments, the abnormality detection messages may include other contextual information regarding the flagged entity address associated with the abnormality, such as historical information regarding communications to or from the address. A subset of this plurality of authorizing entities may submit reciprocating blockchain status updates, such as if the members of the subset agree that the abnormality is problematic and, therefore, that the entity address should be flagged and associated communications blocked. By detecting abnormalities automatically, the system may flag entity addresses and ask for input from the other authorizing entities as to whether a consensus regarding the flagging of the entity address may be reached. By doing so, the system dynamically monitors blockchain communications for possible flagging.

Figure 2:
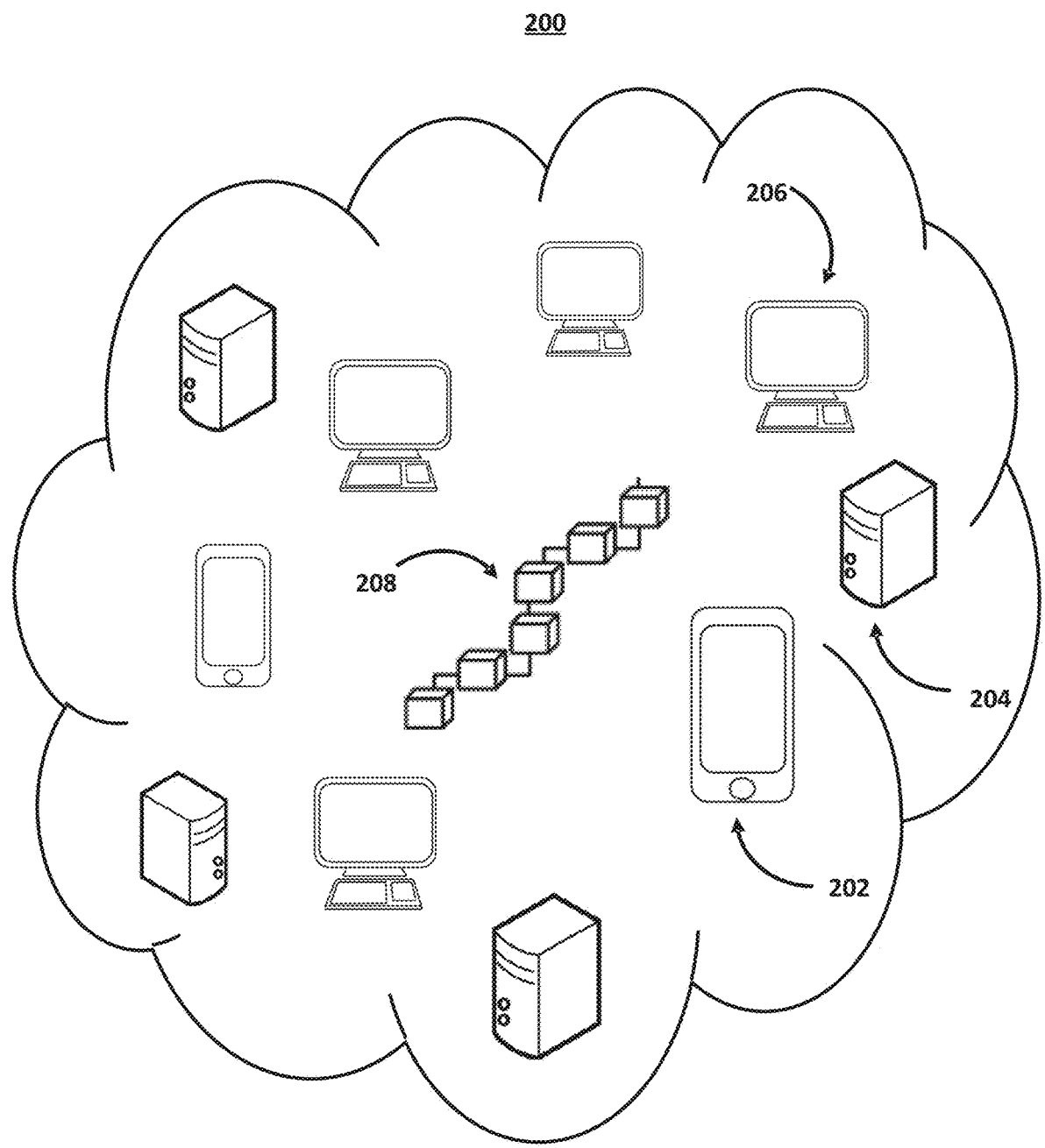
FIG. 2 shows an illustrative diagram for a system for preventing blockchain functions associated with malicious entities, in accordance with one or more embodiments.

FIG. 2 shows an illustrative diagram for a decentralized environment for performing blockchain functions, in accordance with one or more embodiments. For example, the diagram presents various components that may be used to prevent blockchain communications, such as encrypted messages, to malicious entities who have been flagged by authorizing entities, in some embodiments.

As shown in FIG. 2, system 200 may include multiple user devices (e.g., user device 202, user device 204, and/or user device 206). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 200 may interact with, and facilitate the function of, blockchain 208.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain function may equally be applied to, and correspond to, an individual user device (e.g., user device 202, user device 204, and/or user device 206) performing the blockchain function. That is, system 200 may correspond to the user devices (e.g., user device 202, user device 204, and/or user device 206) collectively or individually.

Each of the user devices may be used by the system to conduct blockchain functions and/or contribute to preventing blockchain communications, such as encrypted messages, to malicious entities who have been flagged by authorizing entities. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related non-fungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a non-fungible token. A non-fungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 2, one or more user devices may include a digital wallet (e.g., found on user device 204) used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the Internet while cold wallets are not. Most digital wallet holders hold both a hot wallet and a cold wallet. Hot wallets are most often used to perform blockchain functions, while a cold wallet is generally used for managing a user account and may have no connection to the Internet.

As shown in FIG. 2, one or more user devices may include a private key and/or digital signature. For example, system 200 may use cryptographic systems for evaluating and/or preventing blockchain functions, such as encrypted messages, associated with malicious entities who have been flagged by authorizing entities. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain function) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain functions. As an illustration, when conducting blockchain functions, system 200 may use the digital signature to prove to every node in the system that it is authorized to conduct the blockchain functions.

For example, system 200 may comprise a plurality of nodes for the blockchain network. Each node may correspond to a user device (e.g., user device 202). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 202 may request a blockchain function (e.g., conduct a transaction). The blockchain function may be authenticated by user device 204 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain function, the blockchain function may be authorized. For example, after the blockchain function is authenticated between the users, system 200 may authorize the blockchain function prior to adding it to the blockchain. System 200 may add the blockchain function to blockchain 208. System 200 may perform this based on a consensus of the user devices within system 200. For example, system 200 may rely on a majority (or other metric) of the nodes in the community network (e.g., user device 202, user device 204, and/or user device 206) to determine that the blockchain function is valid. In response to validation of the block, a node user device (e.g., user device 202, user device 204, and/or user device 206) in the community network (e.g., a miner) may receive a reward (e.g., in a given cryptocurrency) as an incentive for validating the block.

To validate the blockchain function, system 200 may use one or more validation protocols and/or validation (or consensus) mechanisms. For example, system 200 may use a POW mechanism in which a user device must provide evidence that it performed computational work to validate a blockchain function and thus this mechanism provides a manner for achieving consensus in a decentralized manner as well as preventing fraudulent validations. For example, the POW may involve iterations of a hashing algorithm. The user device that is successful, aggregates and records blockchain functions from a mempool (e.g., a collection of all valid blockchain functions waiting to be confirmed by the blockchain network) into the next block. Alternatively or additionally, system 200 may use a POS mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 208, and the blockchain function is completed. For example, to add the blockchain function to blockchain 208, the successful node (e.g., the successful miner) encapsulates the blockchain function in a new block before transmitting the block throughout system 200.

Figure 3:
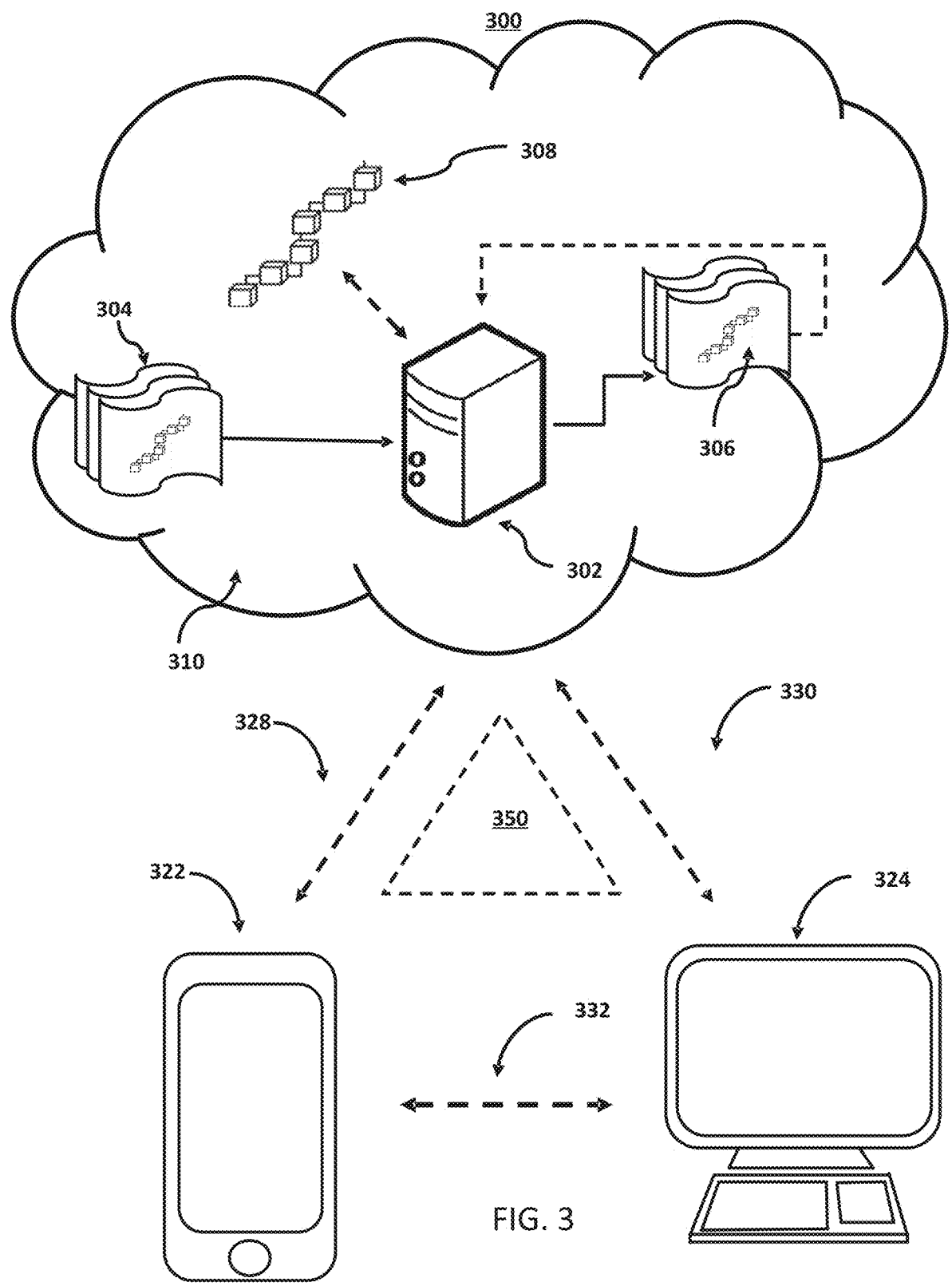
FIG. 3 shows illustrative components for a system used to block blockchain transactions associated with malicious entities using a consensus mechanism, in accordance with one or more embodiments.

FIG. 3 shows illustrative components for a system used to prevent blockchain communications to malicious entities who have been flagged by authorizing entities, in accordance with one or more embodiments. For example, FIG. 3 may show illustrative components for blocking cryptographic communications, such as transfers of control of cryptographic resources or cryptocurrency, based on whether the intended recipients have been flagged by authorizing entities for suspicious or fraudulent behavior. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storage. The electronic storage may include non-transitory storage media that electronically stores information. The electronic storage media of the electronic storage may include one or both of (i) system storage that is provided integrally (e.g., substantially non-removable) with servers or client devices, or (ii) removable storage that is removably connectable to the servers or client devices via, for example, a port (e.g., a Universal Serial Bus (USB) port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., Electrically Erasable Programmable Read-Only Memory (EEPROM), Random Access Memory (RAM), etc.), solid-state storage media (e.g., flash drive, etc.), and/or other electronically readable storage media. The electronic storage may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a Fifth Generation (5G) or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., Internet Protocol Television (IPTV)), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include information such as data relating to flagged entity addresses, authorizing entities that flagged the associated flagged entity addresses, as well as associated counters, as shown in database 100 in FIG. 1A.

Cloud components 310 may access blockchain network 308 (e.g., which in some embodiments may correspond to blockchain 208 (FIG. 2)). Additionally, cloud components 310 may access information associated with self-executing programs, such as off-chain databases storing information related to flagged entity addresses.

Cloud components 310 may include model 302, which may be a machine learning model, artificial intelligence model, deep learning model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether a given entity address may be risky or malicious based on communication information relating to the entity address).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., determining a risk level for the given blockchain communication).

In some embodiments, the model (e.g., model 302) may automatically perform actions based on outputs 306. In some embodiments, the model (e.g., model 302) may not perform any actions. The output of the model (e.g., model 302) may be used to determine whether to block or allow blockchain communication requests.

System 300 also includes an Application Programming Interface (API) layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REpresentational State Transfer (REST) or Web services API layer) may provide a decoupled interface to data and/or functionality of one or more applications. API layer 350 may provide a common, language-agnostic way of interacting with an application. Web services APIs offer a well-defined contract, called Web Services Description Language (WSDL), that describes the services in terms of its operations and the data types used to exchange information. REST APIs do not typically have this contract; instead, they are documented with client libraries for most common languages, including Ruby, Java, Hypertext Preprocessor (PHP), and JavaScript. Simple Object Access Protocol (SOAP) Web services have traditionally been adopted in the enterprise for publishing internal services, as well as for exchanging information with partners in Business-to-Business (B2B) transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between micro services). API layer 350 may use the Advanced Message Queuing Protocol (AMQP) (e.g., Kafka, RabbitMQ, etc.). API layer 350 may use incipient usage of new communications protocols such as google Remote Procedure Calls (gRPC), Thrift, etc.

In some embodiments, the system architecture may use an open API approach. In such cases, API layer 350 may use commercial or open-source API Platforms and their modules. API layer 350 may use a developer portal. API layer 350 may use strong security constraints applying Web Application Firewall (WAF) and Distributed Denial-of-Service (DDoS) protection, and API layer 350 may use RESTful APIs as standard for external integration.

Figure 4:
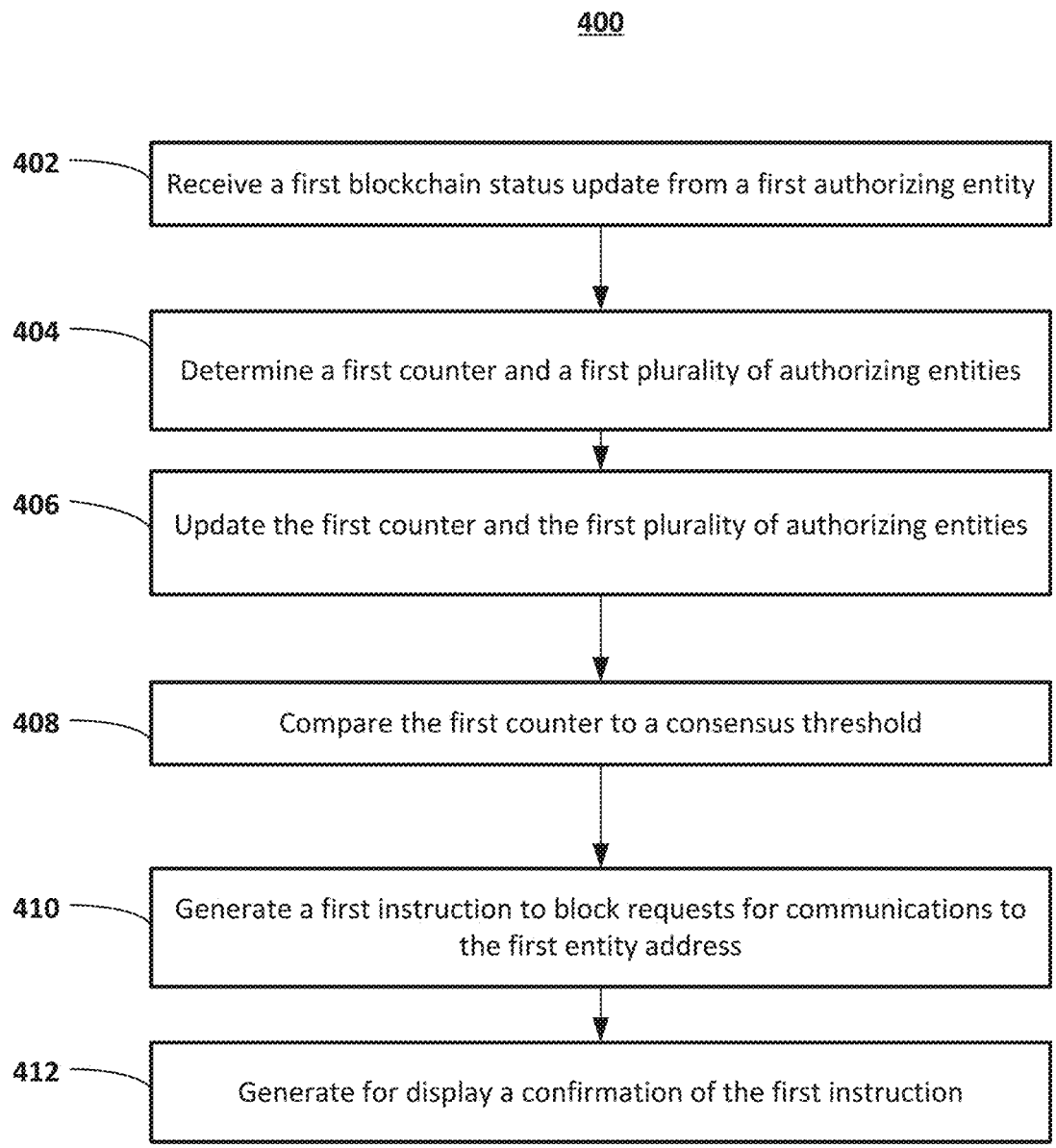
FIG. 4 shows a flowchart of the steps involved in verifying blockchain functions based on consensus between authorized entities when determining malicious entities, in accordance with one or more embodiments.

FIG. 4 shows a flowchart of the steps involved in verifying blockchain functions based on consensus between authorized entities when determining malicious entities, in accordance with one or more embodiments. For example, the system may use process 400 (e.g., as implemented on one or more system components described above) in order to determine whether a request for transferring control of cryptographic resources on the blockchain may be blocked or allowed based on whether the intended recipient has been flagged for malicious behavior.

At step 402, process 400 (e.g., using one or more components described above) enables the system to receive a first blockchain status update from a first authorizing entity. For example, the first blockchain status update can indicate a first entity address corresponding to a first flagged entity. In some embodiments, the system may receive a blockchain status update describing that a given entity address may compromised, or associated with malicious, or suspicious behavior. The update may be generated and transmitted to the system by an authorizing entity, such as an entity managing or operating a blockchain communication-enabled mobile application. By receiving blockchain status updates from authorizing entities, the system enables tracking of which entity addresses may be problematic, as determined by the authorizing entities. Thus, the system may use the information within the blockchain status update to further evaluate the risk associated with communications with the entity address.

At step 404, process 400 (e.g., using one or more components described above) enables the system to determine a first counter and a first plurality of authorizing entities. For example, the system may determine, using a first self-executing program at a blockchain node, a first counter corresponding to the first entity address and the first plurality of authorizing entities that have submitted at least one blockchain status update corresponding to the first entity address. In some embodiments, the system may submit, to the self-executing program, a list of authorizing entities that have flagged a particular entity address due to malicious behavior and determine the counter using the number of such authorizing entities. By doing so, the system may determine whether a given address has already been flagged by authorizing entities for malicious behavior in the past. Accordingly by receiving a plurality of authorizing entities submitting such reports, the system may determine the extent or severity of the risk associated with the authorizing entities and make a decision to block or allow communication requests based on this information.

In some embodiments, the first counter may indicate a first number of authorizing entities within the first plurality of authorizing entities. For example, the counter may indicate a unique number of authorizing entities that have flagged the first entity. By determining a number of authorizing entities that have flagged a given entity, the system may ensure there is sufficient evidence or consensus before making any adverse decisions with regard to the flagged entity. Thus, the system may mitigate the risk of error or frivolous blocking of entities without sufficient evidence or support of malicious behavior associated with the flagged entity address.

In some embodiments, determining the first counter and first plurality of authorizing entities may include requesting the information from a self-executing program at a blockchain node. For example, the system may transmit, to the first self-executing program at the blockchain node, a request for the first counter and the first plurality of authorizing entities. In response to transmitting the request for the first counter and the first plurality of authorizing entities, the system may receive, from the blockchain node, the first counter and the first plurality of authorizing entities. In some embodiments, a list of authorizing entities flagging given entity addresses may be associated with a self-executing program. Thus, the system may retrieve information regarding how many entities have been flagged and by which authorizing entities through transmission of a request for such information and subsequent receipt of this information. Thus, the system may ensure that information regarding flagged entities is retrieved, such that a determination of the counter may be made. By retrieving the plurality of authorizing entities, the system may ensure that no entities have double-flagged a given entity address, to prevent authorizing entities from spamming the system with flagrant reports.

In some embodiments, determining the first plurality of authorizing entities may include its retrieval from an off-chain database. For example, the system may transmit, to the first self-executing program at the blockchain node, a request for an off-chain database address for the first plurality of authorizing entities, wherein the off-chain database address corresponds to a database comprising the first plurality of authorizing entities. The system may receive, from the blockchain node, the off-chain database address. The system may retrieve, from the database corresponding to the off-chain database address, the first plurality of authorizing entities. For example, the system may transmit a request for an address in which the plurality of authorizing entities that flagged the first entity may be recorded. This address, in some embodiments, may be at an off-chain location, such as in cloud storage (e.g., as provided by Amazon Web Services or Google Drive) or in another location accessible through an address (e.g., a uniform resource locator). By storing this information off-chain, the database may maintain the privacy and security of the data, as it may only be accessible to those given access through the self-executing program. Additionally, the list may be modified without being permanently recorded (as may be the case if the information were stored directly on a blockchain). Thus, the system may improve the privacy of information related to malicious entities by storing the information on an off-chain database.

At step 406, process 400 (e.g., using one or more components described above) enables the system to update the first counter and the first plurality of authorizing entities. In some embodiments, the system may add the first authorizing entity to the first plurality of authorizing entities, to indicate that an additional authorizing entity has flagged the first entity address. Additionally or alternatively, the system may determine whether the first authorizing entity has already been flagged, and only add the first authorizing entity if it is not already included within the first plurality of authorizing entities. For example, the counter may count the number of unique authorizing entities that have flagged the entity address. Thus, the system may only count any blockchain status updates by authorizing entities that have already flagged the flagged entity (e.g., each unique authorizing entity), in order to prevent spamming by a single entity. Accordingly, no single entity may unduly influence a flagged entity's status.

At step 408, process 400 (e.g., using one or more components described above) enables the system to compare the first counter to a consensus threshold. In some embodiments, the consensus threshold may indicate a number of authorizing entities for which consensus for the first flagged entity is determined. For example, the system may determine a threshold number of authorizing entities that must have flagged the same flagged entity before taking any further action. The consensus threshold may be determined through a desired fraction of agreement (e.g., a voting threshold) before communication decisions are made. The consensus threshold may depend on the nature of the flagged entity. For example, a flagged entity that is determined to be in a high-risk category of malicious behavior (e.g., associated with hacking) may exhibit a lower consensus threshold than a low-risk category of malicious behavior (e.g., associated with a suspicious volume of communications). As such, the system may ensure that flagged entities flagged by numerous authorizing entities are handled and protected against, while ensuring that flagged entities are not treated differently solely based on a single flagging event. By doing so, the system prevents mistakes in flagging by ensuring that a sufficient number of authorizing entities agree with marking the entity as malicious, suspicious, or otherwise untrustworthy.

In some embodiments, the system may compare the first counter to the consensus threshold by calculating the percentage of authorizing entities that have flagged the first entity. For example, the system may receive a consensus percentage, wherein the consensus percentage indicates a percentage of authorizing entities needed to reach consensus. The system may determine a total number of authorizing entities associated with the first self-executing program. Based on the first counter and the total number of authorizing entities, the system may calculate a percentage of entities that flagged the first flagged entity. The system may compare the consensus threshold with the percentage of entities that flagged the first flagged entity. For example, the system may determine a proportion of the total number of authorizing entities associated with the system or the self-executing program, where the proportion indicates authorizing entities that have flagged the flagged entity. The proportion may be converted to a percentage and compared to the consensus threshold (e.g., a threshold percentage). By considering percentages, the system may continue to determine whether a consensus has been reached regarding a flagged entity, even if the number of authorizing entities fluctuates over time (e.g., as authorizing entities are added or rejected). Thus, the system may prevent changes to criteria or standards for handling flagged entities if the number of authorizing entities changes, thereby providing a robust entity evaluation system for preventing or blocking malicious communications.

At step 410, process 400 (e.g., using one or more components described above) enables the system to generate a first instruction to block requests for communications to the first entity address. In some embodiments, based on comparing the first counter to the consensus threshold, the system may generate a first instruction to block requests for communications to the first entity address. For example, the system may generate and/or transmit an instruction (e.g., to the self-executing program) to ensure that communications to and/or from the flagged entity are not allowed. In some embodiments, users may transmit requests for communications, such as a request to transfer cryptographic resources or cryptocurrency, directly to the self-executing program (e.g., a smart contract) and, based on the generated instruction, the self-executing program may deny or cancel the requested communication if it is directed to the flagged entity. In some embodiments, the system may generate a warning message to a user stating that the intended recipient of the communication has been flagged, enabling the user to select whether to proceed with the communication. By doing so, the system ensures that any entities that have been found to be malicious or otherwise suspicious by a sufficient number of authorizing entities (e.g., above a consensus threshold) may not be allowed to go through. Thus, the system improves the security of blockchain communications by blocking, discouraging, or double-checking communications that are associated with malicious actors.

At step 412, process 400 (e.g., using one or more components described above) enables the system to generate for display a confirmation of the first instruction. For example, the system may generate a dialog box that includes information regarding the entity and information indicating that the communication has been flagged, blocked, or under review. In some embodiments, the system may generate the confirmation to include information related to the flagged entity, such as an entity name, a reason for flagging the entity, and/or an alternative address that corresponds to the real entity (e.g., where the flagged entity address is associated with an entity fraudulently representing itself as a genuine entity). By doing so, the system may alert users of communications that have been blocked or denied and give the users an opportunity to fix the communication (e.g., re-check the target recipient, or re-think the communication or transaction) in response.

In some embodiments, the system may receive a second update for another entity and subsequently block communications to this entity upon determination of a consensus. For example, the system may receive a second blockchain status update from the first authorizing entity, wherein the second blockchain status update indicates a second entity address corresponding to a second flagged entity. The system may, using the first self-executing program, determine a second counter indicating a second number of authorizing entities that have submitted at least one blockchain status update corresponding to the second entity address. The system may compare the second counter to the consensus threshold. Based on comparing the second counter to the consensus threshold, the system may generate a second instruction to block requests for communications to the second entity address. For example, the system may receive multiple entity addresses that have been flagged (e.g., a second entity address in addition to the first) and handle these by calculating another counter corresponding to a number of authorizing entities that flagged the second entity. By determining a unique counter for each flagged entity or flagged entity address, the system may keep track of many entity addresses and generate rules or instructions to handle each of these entities. In some embodiments, the consensus threshold may be different (e.g., a second consensus threshold) depending on the second entity address, such as depending on the second entity. Additionally or alternatively, the consensus threshold may change over time, such that a different consensus threshold may be applied differently to the second blockchain status update as compared to a first blockchain status update at a different time. By doing so, the system exhibits modularity and flexibility in handling flagged entities.

In some embodiments, the system may determine not to block communications based on a blockchain status update indicating a flagged entity. For example, the system may receive a third blockchain status update from the first authorizing entity, wherein the third blockchain status update indicates a third entity address corresponding to a third flagged entity. The system may determine, using the first self-executing program, a third counter indicating a third number of authorizing entities that have submitted at least one blockchain status update corresponding to the third entity address. The system may compare the third counter to the consensus threshold. Based on comparing the third counter to the consensus threshold, the system may determine not to generate a third instruction to block requests for communications to the third entity address. For example, the system may determine that the third counter is not above the given consensus threshold. In some cases, an insufficient number of authorizing entities may have flagged the entity such that the consensus threshold could not be reached. In these (or other) situations, the system may determine not to block requests for communications to the flagged entity, despite the blockchain status update flagging the entity. By doing so, the system may prevent a single authorizing entity (or an insignificant number thereof) from unilaterally causing the system to take adverse action against a given entity. For example, by requiring a consensus to be reached first, the system may prevent blocking of communications to a single authorizing entity's competitor or rival purely based on the authorizing entity's own report or flagging.

In some embodiments, the system may take actions to block or unblock a communication to an entity based on an update frequency for the entity. For example, the system may receive a second blockchain status update from a second authorizing entity, wherein the second blockchain status update indicates the first entity address. The system may determine a first timestamp associated with the first blockchain status update and a second timestamp associated with the second blockchain status update. Based on the first timestamp and the second timestamp, the system may determine an update frequency for the first entity address. The system may compare the update frequency with a threshold frequency and, based on comparing the update frequency with the threshold frequency, the system may generate the first instruction to block requests for communications to the first entity address. For example, the system may determine that a particular flagged entity is receiving a large number of blockchain status updates directed toward it within a short period of time. As a non-limiting example, the flagged entity may be one that is prolific or exhibiting malicious behavior across a large footprint, and, therefore, the flagged entity may be disrupting or detected by multiple authorizing entities over a short period of time. The system may respond to such behavior by blocking requests for communications to such an entity (e.g., by generating an instruction to block requests for communications and transmitting this instruction to the relevant self-executing program or smart contract). By doing so, the system ensures that it may react to dynamically detected malicious behavior, even in situations where a consensus threshold has not been reached, thereby providing time to further evaluate any risk or danger posed by the flagged entity. Thus, the system may improve crisis handling for the authorizing entities, thereby protecting or preventing communications that may be risky or otherwise suspicious.

In some embodiments, the system may generate an instruction to block requests for communications based on an indication of cryptographic resources within the communication request. For example, the system may receive a first request for communication, wherein the first request for communication comprises an indication of cryptographic resources to be transferred to the first entity address. The system may compare the indication of cryptographic resources to a threshold value of cryptographic resources, wherein the threshold value of cryptographic resources indicates a value above which communications with the first entity address are blocked. Based on comparing the indication of cryptographic resources to the threshold value, the system may generate an instruction to block the first request for communication. In some embodiments, the system may determine an indication of cryptographic resources to be transferred (e.g., control of which is to be transferred) to the first entity address. For example, the indication of cryptographic resources may be extracted from or determined from request for communication, and can include a value of cryptocurrency associated with the request (e.g., a value in units of ether or bitcoin), or a value in standard currencies. The system may determine to block the request for communication based on comparing this indication of cryptographic resources with a threshold value. For example, if the indication of cryptographic resources is higher than the threshold value, the system may determine that the communication or transaction is too risky. In some embodiments, this determination may be based on the counter (e.g., the number of authorizing entities that have flagged the intended recipient of the communication). In a non-limiting case, the system may determine, based on the indication of cryptographic resources being lower than the threshold value, that the system should not block any communications (or unblock communications), as the communication may be determined to be insignificant or non-risky. By making decisions for blocking or unblocking requests for communications directed toward flagged entities based on indications of cryptographic resources intended to be transferred, the system may make improved decisions and, subsequently, may improve the security or mitigate the risk associated with such communications.

In some embodiments, the system may validate an authorizing entity's credentials prior to accepting or taking decisions based on the blockchain status update. For example, the system may extract first authorizing entity credentials from the first blockchain status update, wherein the first authorizing entity credentials comprise an authentication token corresponding to the first authorizing entity. The system may validate the first authorizing entity credentials using the first self-executing program. Based on validating the first authorizing entity credentials, the system may generate the first instruction to block requests for communications. For example, the system may require authorizing entities to submit credentials before the system accepts any blockchain status updates regarding flagged entities. The system may require the authorizing entities to input a username, password, and/or any other authentication mechanism (e.g., one-time passwords or two-factor authentication). In this manner, only entities that have been validated for trustworthiness, intention, or motivation may be allowed to flag entities and, thus, cause the system to take adverse action against such flagged entities. By doing so, the system protects the system against invalid, misleading, or fraudulent reporting or flagging of entities, thereby reducing the incidence of false reports or unfair decisions to block communications to entities.

In some embodiments, the system may receive a second blockchain status update indicating a second address that is associated with the first flagged entity and generate an instruction to block communications to this second address as well. For example, the system may receive a second blockchain status update from the first authorizing entity, wherein the second blockchain status update indicates a second entity address. The system may determine that the second entity address corresponds to the first flagged entity. Based on determining that the second entity address corresponds to the first flagged entity, the system may generate a second instruction to block requests for communications to the second entity address. For example, the system may compare an indication of an identifier of an entity associated with the second entity address with other identifiers of flagged entities (e.g., through submitting a request to the self-executing program and receiving matching results in response). The system may determine that the second entity address is associated with, for example, the first flagged entity, even if the second entity address is distinct. For example, the first flagged entity may control various entity addresses. Based on determining that the second entity address is associated with the first flagged entity, the system may generate a second instruction to block requests for communications to the second entity address, even if no consensus has been reached with respect to the second entity address. As consensus may have been reached for the first entity address, as described above, and as the second entity address is associated with the first flagged entity, the system may block communications to the second entity address by its association with the first entity address, without requiring consensus. By doing so, the system may prevent any attempts by the first flagged entity to hide or obscure themselves through the creation of new blockchain addresses. Thus, the system may improve its ability to prevent or mitigate risky blockchain communications by preventing flagged entities from avoiding any levied restrictions or adverse actions using new blockchain addresses.

In some embodiments, the system may detect abnormalities in communications and ask authorizing entities to determine whether the request for communication (and associated entities) should be flagged. For example, the system may receive a request for a communication from a second entity address. The system may detect an abnormality in the request for the communication. Based on detecting the abnormality, the system may transmit a plurality of abnormality detection messages to a second plurality of authorizing entities. Based on transmitting the plurality of abnormality detection messages, the system may receive a plurality of blockchain status updates from a subset of the second plurality of authorizing entities. Based on receiving the plurality of blockchain status updates, the system may generate a second instruction to block requests for communications to the second entity address. For example, the system may determine that a particular request for a communication has properties that may be suspicious or potentially malicious. For example, the request for a communication may be detected to include an abnormality, such as malware, spyware, or other unsecure or undesirable content. In some embodiments, the system may determine that an indication of cryptographic resources (e.g., a value of cryptocurrency) associated with the request for communication is suspiciously high or low, such as above or below a threshold value. For example, in response to determinations of abnormalities, the system may extract the origin address (or, in some embodiments, the target address) of the request for communication and query the authorizing entities as to whether the origin address should be flagged (e.g., through the transmission of an abnormality detection message, and the receipt of blockchain status updates corresponding to the entity associated with the request for communications). In response, the system may evaluate the plurality of blockchain status updates and, thus, determine whether to generate a second instruction to block requests for communications to this second entity address. By doing so, the system may automatically detect abnormal, malicious, or suspicious behavior, and notify authorizing entities of such behavior in order to determine whether to block such communications. By relying on authorizing entities to evaluate these abnormalities, the system may flag abnormalities by ensure that these abnormalities are properly evaluated before taking any adverse action toward any addresses associated with the abnormality.

In some embodiments, the system may request information from other authorizing entities if a given flagged entity has not achieved consensus. For example, based on determining that the first counter is less than the consensus threshold, the system may transmit a blockchain status request to a second authorizing entity, wherein the blockchain status request comprises a request for verifying the first flagged entity. The system may receive, from the second authorizing entity and based on the blockchain status request, a second blockchain status update, wherein the second blockchain status update comprises the first entity address. For example, the system may determine that the first counter does not satisfy the conditions for consensus (e.g., is not greater than the consensus threshold or is less than the consensus threshold). Based on this determination, the system may transmit messages to other authorizing entities (e.g., a second authorizing entity), which may include a request to verify whether the first flagged entity should indeed be flagged. For example, the second authorizing entity may determine that the first flagged entity is malicious or suspicious and, in response, send a blockchain status update indicating this determination. By receiving such blockchain status updates based on requests for further verification, the system may alert other authorizing entities of the fact that a given flagged entity has been reported and, thus, give the other authorizing entities the opportunity to respond (e.g., agree or disagree with the report). By doing so, the system may request feedback from other authorizing entities to achieve consensus in situations where consensus was not originally achieved. Thus, the system may improve detection of problematic entities, even in situations where an insufficient number of authorizing entities have flagged the entity. By doing so, the system may improve the capture of information pertaining to malicious entities and, thus, prevent risky communications thereto.

In some embodiments, the system may purge flagged entities from being tracked or counted after a given amount of time. For example, the system may determine a first timestamp corresponding to a time for generating the first instruction to block requests for communications to the first entity address. Based on determining a system clock setting, the system may determine a second timestamp. The system may determine a time difference between the first timestamp and the second timestamp. Based on comparing the time difference to an entity purging time threshold, the system may generate a second instruction to unblock requests for communications to the first entity address. For example, the system may determine that more than a threshold amount of time (e.g., a purging time threshold) has been reached based on recording a system clock setting. In a non-limiting example, in response, the system may generate an instruction to erase or cancel (e.g., purge) any decision to block communications to the first entity address. In some embodiments, the system may make this decision upon determining that no further suspicious, malicious or adverse behavior associated with the first entity address has been detected since being flagged. In some cases, a particular entity address may not be controlled by the same entity after a period of time and, thus, continuing to block communications to the address may be unfair or unwarranted. By enabling purging after a set time period, the system may improve flexibility and fairness in blocking communications between entities, as it may enable flagged entities to reform their behavior and provide evidence that no suspicious behavior has been detected.

In some embodiments, the system may purge an entity from being blocked based on a request from an authorizing entity. For example, the system may receive an entity purge request from a second authorizing entity, wherein the entity purge request corresponds to a request to unblock requests for communications to the first entity address. Based on receiving the entity purge request, the system may generate a second instruction to unblock requests for communications to the first entity address. For example, an authorizing entity may determine that a flagged entity has taken steps to reformed their behavior, or has been flagged by mistake. The authorizing entity may, thus, submit an entity purge request, where the request corresponds to a request to unblock communication requests. Based on this entity purge request, the system may determine to unblock requests for communications. Thus, the system provides a way to correct or unblock adverse actions taken toward a flagged entity, upon request from an authorizing entity. By doing so, the system enables prevention or correction of mistaken flagging of addresses, as well as enables authorizing entities to have greater control over the entities flagged. In some embodiments, the system may transmit this instruction to the self-executing program, in order to effectuate the purge of the associated entity address.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a first blockchain status update from a first authorizing entity, wherein the first blockchain status update indicates a first entity address corresponding to a first flagged entity, and wherein the first authorizing entity has flagged the first flagged entity due to malicious behavior; determining, using a first self-executing program, a counter and a first plurality of authorizing entities that have submitted at least one blockchain status update corresponding to the first entity address, wherein the counter indicates a first number of authorizing entities within the first plurality of authorizing entities; determining that the first authorizing entity is not included in the first plurality of authorizing entities; based on determining that the first authorizing entity is not included in the first plurality of authorizing entities, updating the counter and the first plurality of authorizing entities; comparing the counter to a consensus threshold, wherein the consensus threshold indicates a second number for which consensus for the first flagged entity is determined, and wherein determining the consensus threshold comprises: receiving a consensus percentage, wherein the consensus percentage indicates a percentage of authorizing entities needed to reach consensus, determining a total number of authorizing entities associated with the first self-executing program, based on the counter and the total number of authorizing entities, calculating a percentage of entities that flagged the first flagged entity, and comparing the consensus threshold with the percentage of entities that flagged the first flagged entity; based on comparing the counter to the consensus threshold, generating an instruction to block requests for communications to the first entity address; generating for display, on a user interface, a confirmation of the instruction; and causing an update to the first self-executing program to include the counter and the first plurality of authorizing entities.

2. A method, the method comprising: receiving a first blockchain status update from a first authorizing entity, wherein the first blockchain status update indicates a first entity address corresponding to a first flagged entity; determining, using a first self-executing program at a blockchain node, a first counter corresponding to the first entity address and a first plurality of authorizing entities that have submitted at least one blockchain status update corresponding to the first entity address; updating the first counter and the first plurality of authorizing entities; comparing the first counter to a consensus threshold, wherein the consensus threshold indicates a number of authorizing entities for which consensus for the first flagged entity is determined; based on comparing the first counter to the consensus threshold, generating a first instruction to block requests for communications to the first entity address; and generating for display, on a user interface, a confirmation of the first instruction.

3. The method of any one of the preceding embodiments, further comprising: receiving a second blockchain status update from the first authorizing entity, wherein the second blockchain status update indicates a second entity address corresponding to a second flagged entity; determining, using the first self-executing program, a second counter indicating a second number of authorizing entities that have submitted at least one blockchain status update corresponding to the second entity address; comparing the second counter to the consensus threshold; and based on comparing the second counter to the consensus threshold, generating a second instruction to block requests for communications to the second entity address.

4. The method of any one of the preceding embodiments, further comprising: receiving a third blockchain status update from the first authorizing entity, wherein the third blockchain status update indicates a third entity address corresponding to a third flagged entity; determining, using the first self-executing program, a third counter indicating a third number of authorizing entities that have submitted at least one blockchain status update corresponding to the third entity address; comparing the third counter to the consensus threshold; and based on comparing the third counter to the consensus threshold, determining not to generate a third instruction to block requests for communications to the third entity address.

5. The method of any one of the preceding embodiments, wherein comparing the first counter to the consensus threshold comprises: receiving a consensus percentage, wherein the consensus percentage indicates a percentage of authorizing entities needed to reach consensus; determining a total number of authorizing entities associated with the first self-executing program; based on the first counter and the total number of authorizing entities, calculating a percentage of entities that flagged the first flagged entity; and comparing the consensus threshold with the percentage of entities that flagged the first flagged entity.

6. The method of any one of the preceding embodiments, further comprising: receiving a second blockchain status update from a second authorizing entity, wherein the second blockchain status update indicates the first entity address; determining a first timestamp associated with the first blockchain status update and a second timestamp associated with the second blockchain status update; based on the first timestamp and the second timestamp, determining an update frequency for the first entity address; comparing the update frequency with a threshold frequency; and based on comparing the update frequency with the threshold frequency, generating the first instruction to block requests for communications to the first entity address.

7. The method of any one of the preceding embodiments, further comprising: receiving a first request for communication, wherein the first request for communication comprises an indication of cryptographic resources to be transferred to the first entity address; comparing the indication of cryptographic resources to a threshold value of cryptographic resources, wherein the threshold value of cryptographic resources indicates a value above which communications with the first entity address are blocked; and based on comparing the indication of cryptographic resources to the threshold value, generating an instruction to block the first request for communication.

8. The method of any one of the preceding embodiments, wherein the first counter indicates a first number of authorizing entities within the first plurality of authorizing entities.

9. The method of any one of the preceding embodiments, wherein determining the first counter and the first plurality of authorizing entities comprises: transmitting, to the first self-executing program at the blockchain node, a request for the first counter and the first plurality of authorizing entities; and in response to transmitting the request for the first counter and the first plurality of authorizing entities, receiving, from the blockchain node, the first counter and the first plurality of authorizing entities.

10. The method of any one of the preceding embodiments, wherein determining the first plurality of authorizing entities comprises: transmitting, to the first self-executing program at the blockchain node, a request for an off-chain database address for the first plurality of authorizing entities, wherein the off-chain database address corresponds to a database comprising the first plurality of authorizing entities; receiving, from the blockchain node, the off-chain database address; and retrieving, from the database corresponding to the off-chain database address, the first plurality of authorizing entities.

11. The method of any one of the preceding embodiments, further comprising: extracting first authorizing entity credentials from the first blockchain status update, wherein the first authorizing entity credentials comprise an authentication token corresponding to the first authorizing entity; validating the first authorizing entity credentials using the first self-executing program; and based on validating the first authorizing entity credentials, generating the first instruction to block requests for communications.

12. The method of any one of the preceding embodiments, further comprising: receiving a second blockchain status update from the first authorizing entity, wherein the second blockchain status update indicates a second entity address; determining that the second entity address corresponds to the first flagged entity; and based on determining that the second entity address corresponds to the first flagged entity, generating a second instruction to block requests for communications to the second entity address.

13. The method of any one of the preceding embodiments, further comprising: receiving a request for a communication from a second entity address; detecting an abnormality in the request for the communication; based on detecting the abnormality, transmitting a plurality of abnormality detection messages to a second plurality of authorizing entities; based on transmitting the plurality of abnormality detection messages, receiving a plurality of blockchain status updates from a subset of the second plurality of authorizing entities; and based on receiving the plurality of blockchain status updates, generating a second instruction to block requests for communications to the second entity address.

14. The method of any one of the preceding embodiments, further comprising: based on determining that the first counter is less than the consensus threshold, transmitting a blockchain status request to a second authorizing entity, wherein the blockchain status request comprises a request for verifying the first flagged entity; and receiving, from the second authorizing entity and based on the blockchain status request, a second blockchain status update, wherein the second blockchain status update comprises the first entity address.

15. The method of any one of the preceding embodiments, further comprising: determining a first timestamp corresponding to a time for generating the first instruction to block requests for communications to the first entity address; based on determining a system clock setting, determining a second timestamp; determining a time difference between the first timestamp and the second timestamp; and based on comparing the time difference to an entity purging time threshold, generating a second instruction to unblock requests for communications to the first entity address.

16. The method of any one of the preceding embodiments, further comprising: receiving an entity purge request from a second authorizing entity, wherein the entity purge request corresponds to a request to unblock requests for communications to the first entity address; and based on receiving the entity purge request, generating a second instruction to unblock requests for communications to the first entity address.

17. A tangible, non-transitory, machine-readable medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for preventing blockchain functions associated with malicious entities, the system comprising:
   one or more processors; and
   one or more non-transitory, computer-readable media comprising instructions that, when executed by the one or more processors, cause operations comprising:
      receiving a first blockchain status update from a first authorizing entity indicating a first entity address corresponding to a first flagged entity flagged by the first authorizing entity due to malicious behavior;
      determining, using a first self-executing program at a blockchain node, a first plurality of authorizing entities that have submitted at least one blockchain status update corresponding to the first entity address, wherein a counter stores an indication of a first number of authorizing entities included within the first plurality of authorizing entities, wherein determining the first plurality of authorizing entities comprises:
         transmitting, to the first self-executing program at the blockchain node, a request for an off-chain database address for the first plurality of authorizing entities, the off-chain database address corresponding to a database comprising the first plurality of authorizing entities;
         receiving, from the blockchain node, the off-chain database address; and retrieving, from the database corresponding to the off-chain database address, the first plurality of authorizing entities;
responsive to determining that the first plurality of authorizing entities lacks the first authorizing entity, updating the counter and the first plurality of authorizing entities;
comparing the counter to a consensus threshold indicating a second number for which consensus for the first flagged entity is determined, and wherein determining the consensus threshold comprises:
receiving a consensus percentage indicating a percentage of authorizing entities needed to reach consensus,
determining a total number of authorizing entities associated with the first self-executing program,
based on the counter and the total number of authorizing entities, calculating a percentage of entities that flagged the first flagged entity, and
comparing the consensus threshold with the percentage of entities that flagged the first flagged entity;
based on comparing the counter to the consensus threshold, generating an instruction to block requests for communications to the first entity address;
generating for display, on a user interface, a confirmation of the instruction; and
causing an update to the first self-executing program to include the counter and the first plurality of authorizing entities.

2. A method for preventing blockchain functions associated with malicious entities, the method comprising:
receiving a first blockchain status update from a first authorizing entity indicating a first entity address corresponding to a first flagged entity;
determining, using a first self-executing program at a blockchain node, a first plurality of authorizing entities that have submitted at least one blockchain status update corresponding to the first entity address by:
transmitting, to the first self-executing program at the blockchain node, a request for an off-chain database address corresponding to a database comprising the first plurality of authorizing entities;
receiving, from the blockchain node, the off-chain database address; and
retrieving, from the database corresponding to the off-chain database address, the first plurality of authorizing entities;
updating, based on the first plurality of authorizing entities, a first counter to store a first number of authorizing entities included by the first plurality of authorizing entities;
determining, based on a comparison of the first number of authorizing entities stored by the first counter to a consensus threshold indicating a second number of authorizing entities for which consensus to block communications for the first flagged entity is to be determined prior to the communications for the first flagged entity being blocked, that the first number of authorizing entities exceeds the consensus threshold;
based on the first number of authorizing entities stored by the first counter exceeding the consensus threshold, generating a first instruction to block requests for communications to the first entity address;
generating, for display on a user interface, a confirmation of the first instruction; and
transmitting, to the blockchain node, the first instruction to block the requests based on the confirmation.

3. The method of claim 2, further comprising:
receiving a second blockchain status update from the first authorizing entity indicating a second entity address corresponding to a second flagged entity;
determining, using the first self-executing program, a second plurality of authorizing entities that have submitted at least one blockchain status update corresponding to the second entity address;
updating, based on the second plurality of authorizing entities, a second counter to store a third number of authorizing entities included by the second plurality of authorizing entities;
determining, based on a comparison of the third number of authorizing entities stored by the second counter to the consensus threshold, that the third number of authorizing entities exceeds the consensus threshold; and
based on the third number of authorizing entities stored by the second counter exceeding the consensus threshold, generating a second instruction to block requests for communications to the second entity address.

4. The method of claim 2, further comprising:
receiving a third blockchain status update from the first authorizing entity indicating a third entity address corresponding to a third flagged entity;
determining, using the first self-executing program, a second plurality of authorizing entities that have submitted at least one blockchain status update corresponding to the third entity address;
updating, based on the second plurality of authorizing entities, a second counter to store a third number of authorizing entities included by the second plurality of authorizing entities;
determining, based on a comparison of the third number of authorizing entities stored by the second counter to the consensus threshold, that the third number of authorizing entities fails to exceed the consensus threshold; and
based on the third number of authorizing entities stored by the second counter failing to exceed the consensus threshold, preventing generation of a third instruction to block requests for communications to the third entity address.

5. The method of claim 2, wherein determining that the first number of authorizing entities exceeds the consensus threshold comprises:
receiving an indication of a consensus percentage indicating a percentage of authorizing entities needed to reach consensus;
determining a total number of authorizing entities associated with the first self-executing program;
based on the first number of authorizing entities stored by the first counter and the total number of authorizing entities, calculating a percentage of authorizing entities that flagged the first flagged entity; and
determining that the percentage of authorizing entities is greater than or equal to a threshold percentage of authorizing entities corresponding to the consensus threshold being exceeded.

6. The method of claim 2, wherein generating the first instruction comprises:
receiving a second blockchain status update from a second authorizing entity indicating the first entity address;
determining a first timestamp associated with the first blockchain status update and a second timestamp associated with the second blockchain status update;

based on the first timestamp and the second timestamp, determining an update frequency for the first entity address; and determining that the update frequency exceeds a threshold frequency, the first instruction being generated based on the update frequency exceeding the threshold frequency.

7. The method of claim 2, further comprising:

receiving a first request for a communication comprising an indication of a number of cryptographic resources to be transferred to the first entity address; and generating, based on the number of cryptographic resources being greater than or equal to a threshold value of cryptographic resources, an instruction to block the first request.

8. The method of claim 2, wherein the request for the off-chain database address comprises a first request, updating the first counter comprises:

transmitting, to the first self-executing program at the blockchain node, a second request for a number of authorizing entities included within the first plurality of authorizing entities; and receiving, from the blockchain node, the first number of authorizing entities included within the first plurality of authorizing entities.

9. The method of claim 2, further comprising:

extracting first authorizing entity credentials from the first blockchain status update, wherein the first authorizing entity credentials comprise an authentication token corresponding to the first authorizing entity;

validating the first authorizing entity credentials using the first self-executing program; and based on validating the first authorizing entity credentials, generating the first instruction to block requests for communications.

10. The method of claim 2, further comprising:

receiving a second blockchain status update from the first authorizing entity indicating a second entity address;

determining that the second entity address corresponds to the first flagged entity; and based on determining that the second entity address corresponds to the first flagged entity, generating a second instruction to block requests for communications to the second entity address.

11. The method of claim 2, further comprising:

receiving a request for a communication from a second entity address;

detecting an abnormality in the request for the communication;

based on the abnormality, transmitting a plurality of abnormality detection messages to a second plurality of authorizing entities;

receiving, as responses to the plurality of abnormality detection messages, a plurality of blockchain status updates from a subset of the second plurality of authorizing entities; and based on receiving the plurality of blockchain status updates, generating a second instruction to block requests for communications to the second entity address.

12. The method of claim 2, further comprising:

determining, prior to the first blockchain status update being received, that a number of authorizing entities included in the first plurality of authorizing entities is less than the consensus threshold;

transmitting, based on the number of authorizing entities included in the first plurality of authorizing entities being less than the consensus threshold, a blockchain status request to a second authorizing entity, wherein the blockchain status request comprises a request for verifying the first flagged entity; and receiving, from the second authorizing entity and based on the blockchain status request, a second blockchain status update, wherein the second blockchain status update comprises the first entity address.

13. The method of claim 2, further comprising:

determining a first timestamp corresponding to a time the first instruction to block requests for communications to the first entity address was generated;

based on determining a system clock setting, determining a second timestamp;

determining a time difference between the first timestamp and the second timestamp; and based on the time difference being greater than an entity purging time threshold, generating a second instruction to unblock requests for communications to the first entity address.

14. The method of claim 2, further comprising:

receiving an entity purge request from a second authorizing entity to unblock requests for communications to the first entity address; and based on the entity purge request, generating a second instruction to unblock requests for communications to the first entity address.

15. One or more non-transitory, computer-readable media storing instructions that, when executed by one or more processors, cause operations comprising:

receiving a blockchain status update from an authorizing entity indicating an entity address corresponding to a flagged entity;

determining, using a self-executing program at a blockchain node, a first plurality of authorizing entities that have submitted at least one blockchain status update corresponding to the entity address by:

transmitting, to the self-executing program at the blockchain node, a request for an off-chain database address corresponding to a database comprising the first plurality of authorizing entities; and retrieving, from the database corresponding to the off-chain database address, the first plurality of authorizing entities;

updating, based on the first plurality of authorizing entities, a counter to store a first number of authorizing entities included by the first plurality of authorizing entities;

determining, based on a comparison of the first number of authorizing entities stored by the counter to a consensus threshold indicating a second number of authorizing entities for which consensus to block communications for the flagged entity is to be determined prior to the communications for the flagged entity being blocked, that the first number of authorizing entities exceeds the consensus threshold;

based on the first number of authorizing entities stored by the counter exceeding the consensus threshold, generating an instruction to block requests for communications to the entity address;

generating, for display on a user interface, a confirmation of the instruction; and transmitting, to the blockchain node, the instruction to block the requests based on the confirmation.

16. The one or more non-transitory, computer-readable media of claim 15, wherein the instructions cause operations further comprising:

receiving a second blockchain status update from the authorizing entity indicating a second entity address corresponding to a second flagged entity;

determining, using the self-executing program, a second plurality of authorizing entities that have submitted at least one blockchain status update corresponding to the second entity address;

updating, based on the second plurality of authorizing entities, a second counter to store a third number of authorizing entities included by the second plurality of authorizing entities;

determining, based on a comparison of the third number of authorizing entities stored by the second counter to the consensus threshold, that the third number of authorizing entities exceeds the consensus threshold; and based on the third number of authorizing entities stored by the second counter exceeding the consensus threshold, generating a second instruction to block requests for communications to the second entity address.

17. The one or more non-transitory, computer-readable media of claim 15, wherein the instructions cause operations further comprising:

receiving a third blockchain status update from the authorizing entity indicating a third entity address corresponding to a third flagged entity;

determining, using the self-executing program, a second plurality of authorizing entities that have submitted at least one blockchain status update corresponding to the third entity address;

updating, based on the second plurality of authorizing entities, a second counter to store a third number of authorizing entities included by the second plurality of authorizing entities;

determining, based on a comparison of the third number of authorizing entities stored by the second counter to the consensus threshold, that the third number of authorizing entities fails to exceed the consensus threshold; and based on the third number of authorizing entities stored by the second counter failing to exceed the consensus threshold, preventing generation of an instruction to block requests for communications to the third entity address.

18. The one or more non-transitory, computer-readable media of claim 15, wherein determining that the first number of authorizing entities exceeds the consensus threshold comprises:

receiving an indication of a consensus percentage indicating a percentage of authorizing entities needed to reach consensus;

determining a total number of authorizing entities associated with the self-executing program;

based on the first number of authorizing entities stored by the counter and the total number of authorizing entities, calculating a percentage of authorizing entities that flagged the flagged entity; and determining that the percentage of authorizing entities is greater than or equal to a threshold percentage of authorizing entities corresponding to the consensus threshold being exceeded.

\* \* \* \* \*